United States Patent
Keating et al.

(10) Patent No.: US 12,556,335 B2
(45) Date of Patent: Feb. 17, 2026

(54) APPARATUS, METHODS, AND COMPUTER PROGRAMS RELATED TO POSITIONING REFERENCE SIGNALS

(71) Applicant: Nokia Technologies Oy, Espoo (FI)

(72) Inventors: Ryan Keating, Chicago, IL (US); Tao Tao, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 297 days.

(21) Appl. No.: 18/164,318

(22) Filed: Feb. 3, 2023

(65) Prior Publication Data

US 2023/0261837 A1    Aug. 17, 2023

(30) Foreign Application Priority Data

Feb. 14, 2022   (WO) ................ PCT/CN2022/076177

(51) Int. Cl.
*H04L 5/00*  (2006.01)
*H04W 24/10*  (2009.01)

(52) U.S. Cl.
CPC ........... *H04L 5/0051* (2013.01); *H04W 24/10* (2013.01)

(58) Field of Classification Search
CPC .............................. H04L 5/0051; H04W 24/10
See application file for complete search history.

(56) References Cited

U.S. PATENT DOCUMENTS

| | | |
|---|---|---|
| 2019/0053280 A1 | 2/2019 | Rico Alvarino et al. |
| 2021/0328737 A1 | 10/2021 | Manolakos et al. |
| 2021/0337377 A1 | 10/2021 | Manolakos et al. |
| 2021/0360578 A1 | 11/2021 | Manolakos et al. |
| 2023/0030759 A1* | 2/2023 | Wu .......................... H04W 4/02 |
| 2023/0099307 A1 | 3/2023 | Bao et al. |
| 2024/0015686 A1* | 1/2024 | Rao ........................ H04W 64/00 |
| 2024/0187903 A1* | 6/2024 | Hasegawa ............ H04B 17/328 |

FOREIGN PATENT DOCUMENTS

| | | |
|---|---|---|
| WO | 2021/194801 A1 | 9/2021 |
| WO | 2021/206891 A1 | 10/2021 |
| WO | 2022/006185 A1 | 1/2022 |
| WO | 2022/011597 A1 | 1/2022 |
| WO | 2023/033911 A1 | 3/2023 |
| WO | 2023/080684 A1 | 5/2023 |

OTHER PUBLICATIONS

Examination Report for Australian Application No. 2022440272 dated Mar. 4, 2025, 3 pages.

(Continued)

*Primary Examiner* — Zhiren Qin
(74) *Attorney, Agent, or Firm* — ALSTON & BIRD LLP

(57) ABSTRACT

There is disclosed a method comprising: receiving priority information indicative of a priority state of at least one positioning reference signal, receiving time window information configuring a time window that is outside of a measurement gap; and based on the priority information and the time window information, receiving one or more positioning reference signals during the time window by using one or more buffer symbols.

23 Claims, 10 Drawing Sheets

(56) References Cited

OTHER PUBLICATIONS

Qualcomm Incorporated, "Remaining issues on Latency Improvements for Positioning", 3GPP TSG RAN WG1 #107-e, R1-2112220, (Nov. 11-19, 2021), 13 pages.
Vivo, "Remaining issues on inactive state positioning and on-demand PRS", 3GPP TSG RAN WG1 #107-e, R1-2111018, (Nov. 11-19, 2021), 16 pages.
"3rd Generation Partnership Project; Technical Specification Group Radio Access Network; NR; Physical layer procedures for data (Release 16)", 3GPP TS 38.214, V16.7.0, Sep. 2021, pp. 1-172.
"New WID: NR Positioning Support", 3GPP TSG RAN Meeting #83, RP-190752, Agenda: 9.1.1, Intel Corporation, Mar. 18-21, 2019, 6 pages.
"Revised WID on NR Positioning Enhancements", 3GPP TSG RAN Meeting #91e, RP-210897, Agenda: 9.7.25, Intel Corporation, Mar. 16-26, 2022, 6 pages.
"Revised WID on support of reduced capability NR devices", 3GPP TSG RAN Meeting #92e, RP-211574, Agenda: 9.7.1.7, Ericsson, Jun. 14-18, 2021, 6 pages.
"Summary #3 of [107-e-NR-ePos-04] latency improvements", 3GPP TSG-RAN WG1 Meeting #107-e, R1-2112459, Agenda: 8.5.4, Huawei, Nov. 11-19, 2021, 84 pages.
"FL summary #1 of 8.5.4 latency improvements for DL and DL+UL methods", 3GPP TSG RAN WG1 #105-e , R1-2105989, Agenda: 8.5.4, Huawei, May 10-27, 2021, 20 pages.
International Search Report and Written Opinion received for corresponding Patent Cooperation Treaty Application No. PCT/CN2022/076177, dated Aug. 1, 2022, 10 pages.
"Summary #2 of [107-e-NR-ePos-04] latency improvements", 3GPP TSG-RAN WG1 Meeting #107-e, R1-2112458, Agenda: 8.5.4, Huawei, Nov. 11-19, 2021, 78 pages.
"Summary #1 of [107-e-NR-ePos-04] latency improvements", 3GPP TSG-RAN WG1 Meeting #107-e, R1-2112457, Agenda: 8.5.4, Huawei, Nov. 11-19, 2021, 43 pages.
Notice of Acceptance for Australian Application No. 2022440272 dated May 27, 2025, 3 pages.
Office Action for Algerian Application No. DZ/P/2024/1139 dated May 21, 2025, 2 pages.
Office Action for Chilean Application No. 202402423 dated Aug. 13, 2025, 18 pages.
Office Action for Japanese Application No. 2024-547712 dated Jul. 17, 2025, 6 pages.
Decision to Grant for ARIPO Application No. AP/P/2024/015904 dated Oct. 8, 2025, 43 pages.
Office Action for Canadian Application No. 3,251,874 dated Oct. 16, 2025, 5 pages.

\* cited by examiner

APPARATUS, METHODS, AND COMPUTER PROGRAMS RELATED TO POSITIONING REFERENCE SIGNALS

RELATED APPLICATION

This application was originally filed as PCT Application No. PCT/CN2022/076177, filed on Feb. 14, 2022, which is incorporated herein by reference in its entirety.

FIELD

This disclosure relates to communications, and more particularly to an apparatus, methods and computer programs in a wireless communication system. More particularly, the present invention relates to user equipment positioning.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices. The communication may comprise, for example, communication of data for carrying data for voice, electronic mail (email), text message, multimedia and/or content data communications and so on. Non-limiting examples of services provided include two-way or multi-way calls, data communication or multimedia services and access to a data network system, such as the Internet.

In a wireless system at least a part of communications occurs over wireless interfaces. Examples of wireless systems include public land mobile networks (PLMN), satellite based communication systems and different wireless local networks, for example wireless local area networks (WLAN). A local area wireless networking technology allowing devices to connect to a data network is known by the tradename WiFi (or Wi-Fi). WiFi is often used synonymously with WLAN. The wireless systems can be divided into cells, and are therefore often referred to as cellular systems. A base station provides at least one cell.

A user can access a communication system by means of an appropriate communication device or terminal capable of communicating with a base station. Hence nodes like base stations are often referred to as access points. A communication device of a user is often referred to as user equipment (UE). A communication device is provided with an appropriate signal receiving and transmitting apparatus for enabling communications, for example enabling communications with the base station and/or communications directly with other user devices. The communication device can communicate on appropriate channels, e.g. listen to a channel on which a station, for example a base station of a cell, transmits.

A communication system and associated devices typically operate in accordance with a given standard or specification which sets out what the various entities associated with the system are permitted to do and how that should be achieved. Communication protocols and/or parameters which shall be used for the connection are also typically defined. Non-limiting examples of standardised radio access technologies include GSM (Global System for Mobile), EDGE (Enhanced Data for GSM Evolution) Radio Access Networks (GERAN), Universal Terrestrial Radio Access Networks (UTRAN) and evolved UTRAN (E-UTRAN). An example communication system architecture is the long-term evolution (LTE) of the Universal Mobile Telecommunications System (UMTS) radio-access technology. The LTE is standardized by the third Generation Partnership Project (3GPP). The LTE employs the Evolved Universal Terrestrial Radio Access Network (E-UTRAN) access and a further development thereof which is sometimes referred to as LTE Advanced (LTE-A).

Since introduction of fourth generation (4G) services increasing interest has been paid to the next, or fifth generation (5G) standard. 5G may also be referred to as a New Radio (NR) network.

A Release 16 (Rel-16) work item was conducted in 3GPP for native positioning support of UE in New Radio (NR).

STATEMENT OF INVENTION

According to a first aspect there is provided an apparatus comprising at least one processor; and at least one memory including computer program code; the at least one memory and the computer program code configured to, with the at least one processor, cause the apparatus at least to perform: receiving priority information indicative of a priority state of at least one positioning reference signal; receiving time window information configuring a time window that is outside of a measurement gap; and based on the priority information and the time window information, receiving one or more positioning reference signals during the time window by using one or more buffer symbols.

According to some examples, the at least one memory and the computer program code are configured to, with the at least one processor, cause the apparatus at least to perform: configuring the apparatus in the priority state.

According to some examples the at least one memory and the computer program code are configured to, with the at least one processor, cause the apparatus at least to perform receiving a configuration for the one or more buffer symbols.

According to some examples, the configuration for the buffer symbols is received from one or more of: a base station; a network.

According to some examples, the using one or more buffer symbols is based on the received configuration for the one or more buffer symbols.

According to some examples, the one or more buffer symbols are used to give the apparatus sufficient time to perform beam switching for reception of the one or more positioning reference signals.

According to some examples, the one or more buffer symbols are used to give the apparatus sufficient time to process received downlink control information.

According to some examples, the one or more buffer symbols are positioned at the beginning of the time window.

According to some examples, at least one of the one or more buffer symbols is positioned before the start of the time window.

According to some examples, the priority information indicates one of: a first priority state; a second priority state; a third priority state.

According to some examples the first priority state comprises a high priority state for the one or more positioning reference signals, the second priority state comprises an intermediate priority state for the one or more positioning reference signals, and the third priority state comprises a low priority state for the one or more positioning reference signals.

According to some examples, the priority information indicates the first priority state, the apparatus is configured to prioritize the one or more positioning reference signals relative to a physical downlink shared channel, such that for at least part of the time window the physical downlink shared channel is dropped in favour of the one or more positioning reference signals.

According to some examples, the apparatus is configured to prioritize low latency traffic on a physical downlink shared channel relative to the one or more positioning reference signals, when the priority information indicates the second priority state.

According to some examples, the apparatus is configured to drop at least one of the one or more positioning reference signals in favour of at least one of the one or more buffer symbols, when the priority information indicates the second priority state.

According to some examples, the at least one memory and the computer program code are configured to, with the at least one processor, cause the apparatus at least to perform: performing a positioning reference signal measurement based on a partial position reference resource due to the drop of the at least one of the one or more positioning reference signal symbols; and/or sending an indication that the positioning reference signal measurement made by the apparatus is based on the partial positioning reference signals resource.

According to some examples, the indication is sent to the network.

According to some examples, the apparatus is configured to consider the one or more positioning reference signals as lower priority than a physical downlink control channel and/or a physical downlink shared channel, when the priority information indicates the third priority state.

According to some examples, a length of the one or more buffer symbols is determined based on at least one of maximum values of: time taken for beam switching; time taken to complete decoding of downlink control information.

According to some examples, the apparatus comprises a user equipment.

According to a second aspect there is provided an apparatus comprising means for performing: receiving priority information indicative of a priority state of at least one positioning reference signal; receiving time window information configuring a time window that is outside of a measurement gap; and based on the priority information and the time window information, receiving one or more positioning reference signals during the time window by using one or more buffer symbols.

According to some examples, the means are further configured to perform configuring the apparatus in the priority state.

According to some examples the means are further configured to perform receiving a configuration for the one or more buffer symbols.

According to some examples, the configuration for the buffer symbols is received from one or more of: a base station; a network.

According to some examples, the using one or more buffer symbols is based on the received configuration for the one or more buffer symbols.

According to some examples, the one or more buffer symbols are used to give the apparatus sufficient time to perform beam switching for reception of the one or more positioning reference signals.

According to some examples, the one or more buffer symbols are used to give the apparatus sufficient time to process received downlink control information.

According to some examples, the one or more buffer symbols are positioned at the beginning of the time window.

According to some examples, at least one of the one or more buffer symbols is positioned before the start of the time window.

According to some examples, the priority information indicates one of: a first priority state; a second priority state; a third priority state.

According to some examples the first priority state comprises a high priority state for the one or more positioning reference signals, the second priority state comprises an intermediate priority state for the one or more positioning reference signals, and the third priority state comprises a low priority state for the one or more positioning reference signals.

According to some examples, the priority information indicates the first priority state, the apparatus is configured to prioritize the one or more positioning reference signals relative to a physical downlink shared channel, such that for at least part of the time window the physical downlink shared channel is dropped in favour of the one or more positioning reference signals.

According to some examples, the apparatus is configured to prioritize low latency traffic on a physical downlink shared channel relative to the one or more positioning reference signals, when the priority information indicates the second priority state.

According to some examples, the apparatus is configured to drop at least one of the one or more positioning reference signals in favour of at least one of the one or more buffer symbols, when the priority information indicates the second priority state.

According to some examples, the means are further configured to perform a positioning reference signal measurement based on a partial position reference resource due to the drop of the at least one of the one or more positioning reference signal symbols; and/or sending an indication that the positioning reference signal measurement made by the apparatus is based on the partial positioning reference signals resource.

According to some examples, the indication is sent to the network.

According to some examples, the apparatus is configured to consider the one or more positioning reference signals as lower priority than a physical downlink control channel and/or a physical downlink shared channel, when the priority information indicates the third priority state.

According to some examples, a length of the one or more buffer symbols is determined based on at least one of maximum values of: time taken for beam switching; time taken to complete decoding of downlink control information.

According to some examples, the apparatus comprises a user equipment.

According to a third aspect there is provided an apparatus comprising: receiving circuitry for receiving priority information indicative of a priority state of at least one positioning reference signal; receiving time window information configuring a time window that is outside of a measurement gap; and based on the priority information and the time window information, receiving one or more positioning reference signals during the time window by using one or more buffer symbols.

According to a fourth aspect there is provided a method comprising: receiving priority information indicative of a priority state of at least one positioning reference signal; receiving time window information configuring a time window that is outside of a measurement gap; and based on the priority information and the time window information, receiving one or more positioning reference signals during the time window by using one or more buffer symbols.

According to some examples, the method comprises configuring the apparatus in the priority state.

According to some examples the method comprises receiving a configuration for the one or more buffer symbols.

According to some examples, the configuration for the buffer symbols is received from one or more of: a base station; a network.

According to some examples, the using one or more buffer symbols is based on the received configuration for the one or more buffer symbols.

According to some examples, the one or more buffer symbols are used to give the apparatus sufficient time to perform beam switching for reception of the one or more positioning reference signals.

According to some examples, the one or more buffer symbols are used to give the apparatus sufficient time to process received downlink control information.

According to some examples, the one or more buffer symbols are positioned at the beginning of the time window.

According to some examples, at least one of the one or more buffer symbols is positioned before the start of the time window.

According to some examples, the priority information indicates one of: a first priority state; a second priority state; a third priority state.

According to some examples the first priority state comprises a high priority state for the one or more positioning reference signals, the second priority state comprises an intermediate priority state for the one or more positioning reference signals, and the third priority state comprises a low priority state for the one or more positioning reference signals.

According to some examples, the priority information indicates the first priority state, the apparatus is configured to prioritize the one or more positioning reference signals relative to a physical downlink shared channel, such that for at least part of the time window the physical downlink shared channel is dropped in favour of the one or more positioning reference signals.

According to some examples, the method comprises prioritizing low latency traffic on a physical downlink shared channel relative to the one or more positioning reference signals, when the priority information indicates the second priority state.

According to some examples, the method comprises dropping at least one of the one or more positioning reference signals in favour of at least one of the one or more buffer symbols, when the priority information indicates the second priority state.

According to some examples, the method comprises performing a positioning reference signal measurement based on a partial position reference resource due to the drop of the at least one of the one or more positioning reference signal symbols; and/or sending an indication that the positioning reference signal measurement made by the apparatus is based on the partial positioning reference signals resource.

According to some examples, the indication is sent to the network.

According to some examples, the method comprises considering the one or more positioning reference signals as lower priority than a physical downlink control channel and/or a physical downlink shared channel, when the priority information indicates the third priority state.

According to some examples, a length of the one or more buffer symbols is determined based on at least one of maximum values of: time taken for beam switching; time taken to complete decoding of downlink control information.

According to some examples, the apparatus comprises a user equipment.

According to a fifth aspect there is provided a computer program comprising instructions for causing an apparatus to perform at least the following: receiving priority information indicative of a priority state of at least one positioning reference signal; receiving time window information configuring a time window that is outside of a measurement gap; and based on the priority information and the time window information, receiving one or more positioning reference signals during the time window by using one or more buffer symbols.

According to a sixth aspect there is provided a computer program comprising instructions stored thereon for performing at least the following: receiving priority information indicative of a priority state of at least one positioning reference signal; receiving time window information configuring a time window that is outside of a measurement gap; and based on the priority information and the time window information, receiving one or more positioning reference signals during the time window by using one or more buffer symbols.

According to a seventh aspect there is provided a non-transitory computer readable medium comprising program instructions for causing an apparatus to perform at least the following: receiving priority information indicative of a priority state of at least one positioning reference signal; receiving time window information configuring a time window that is outside of a measurement gap; and based on the priority information and the time window information, receiving one or more positioning reference signals during the time window by using one or more buffer symbols.

According to an eighth aspect there is provided a non-transitory computer readable medium comprising program instructions stored thereon for performing at least the following: receiving priority information indicative of a priority state of at least one positioning reference signal; receiving time window information configuring a time window that is outside of a measurement gap; and based on the priority information and the time window information, receiving one or more positioning reference signals during the time window by using one or more buffer symbols.

According to a ninth aspect there is provided an apparatus comprising at least one processor; and at least one memory including computer program code; the at least one memory and the computer program code configured to, with the at least one processor, cause the apparatus at least to perform: sending, to a user device, priority information indicative of a priority state of positioning reference signals; sending, to the user device, time window information for configuring a time window that is outside of a measurement gap; and sending a buffer symbol configuration to the user device, the buffer symbol configuration for use by the user device in receiving one or more positioning reference signals.

According to some examples, the at least one memory and the computer program code are configured to, with the at least one processor, cause the apparatus at least to perform cross-slot scheduling when sending the priority information.

According to some examples, the apparatus comprises a base station.

According to a tenth aspect there is provided an apparatus comprising means for performing: sending, to a user device, priority information indicative of a priority state of positioning reference signals; sending, to the user device, time window information for configuring a time window that is outside of a measurement gap; and sending a buffer symbol configuration to the user device, the buffer symbol configuration for use by the user device in receiving one or more positioning reference signals.

According to some examples the means are further configured to perform cross-slot scheduling when sending the priority information.

According to some examples, the apparatus comprises a base station.

According to an eleventh aspect there is provided an apparatus comprising: circuitry for sending, to a user device, priority information indicative of a priority state of positioning reference signals; sending, to the user device, time window information for configuring a time window that is outside of a measurement gap; and sending a buffer symbol configuration to the user device, the buffer symbol configuration for use by the user device in receiving one or more positioning reference signals.

According to a twelfth aspect there is provided a method comprising: sending, to a user device, priority information indicative of a priority state of positioning reference signals; sending, to the user device, time window information for configuring a time window that is outside of a measurement gap; and sending a buffer symbol configuration to the user device, the buffer symbol configuration for use by the user device in receiving one or more positioning reference signals.

According to some examples the method comprises performing cross-slot scheduling when sending the priority information.

According to a thirteenth aspect there is provided a computer program comprising instructions for causing an apparatus to perform at least the following: sending, to a user device, priority information indicative of a priority state of positioning reference signals; sending, to the user device, time window information for configuring a time window that is outside of a measurement gap; and sending a buffer symbol configuration to the user device, the buffer symbol configuration for use by the user device in receiving one or more positioning reference signals.

According to a fourteenth aspect there is provided a computer program comprising instructions stored thereon for performing at least the following: sending, to a user device, priority information indicative of a priority state of positioning reference signals; sending, to the user device, time window information for configuring a time window that is outside of a measurement gap; and sending a buffer symbol configuration to the user device, the buffer symbol configuration for use by the user device in receiving one or more positioning reference signals.

According to a fifteenth aspect there is provided a non-transitory computer readable medium comprising program instructions for causing an apparatus to perform at least the following: sending, to a user device, priority information indicative of a priority state of positioning reference signals; sending, to the user device, time window information for configuring a time window that is outside of a measurement gap; and sending a buffer symbol configuration to the user device, the buffer symbol configuration for use by the user device in receiving one or more positioning reference signals.

According to a sixteenth aspect there is provided a non-transitory computer readable medium comprising program instructions stored thereon for performing at least the following: sending, to a user device, priority information indicative of a priority state of positioning reference signals; sending, to the user device, time window information for configuring a time window that is outside of a measurement gap; and sending a buffer symbol configuration to the user device, the buffer symbol configuration for use by the user device in receiving one or more positioning reference signals.

BRIEF DESCRIPTION OF FIGURES

The invention will now be described in further detail, by way of example only, with reference to the following examples and accompanying drawings, in which.

DETAILED DESCRIPTION

Figure 1:
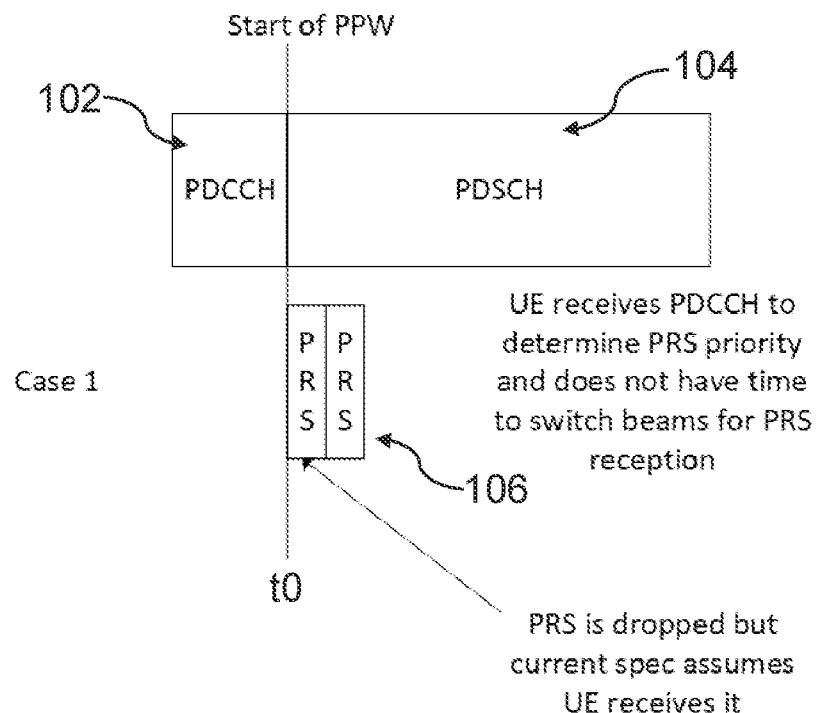
FIG. 1 schematically shows a prior art example of a UE receiving positioning reference signals.

The following positioning solutions are specified for NR Rel-16:

Downlink Time Difference of Arrival (DL-TDOA)
Uplink Time Difference of Arrival (UL-TDOA)
Downlink Angle of Departure (DL-AoD)
Uplink Angle of Arrival (UL-AoA)
Multi-cell Round Trip Time (Multi-RTT)

In Rel-17, 3GPP started NR positioning enhancement work [RP-210897, "Revised WID on NR Positioning Enhancements], focusing on increasing accuracy, reducing latency and increasing efficiency (low complexity; low power consumption; low overhead) based on Rel-16 solutions.

As part of the work on reducing latency, a new feature allowing a UE to measure the Positioning Reference Signal (PRS) outside of the measurement gap (MG) was introduced.

Subject to UE capability, support PRS measurement outside the MG, within a PRS processing window, and UE measurement inside the active downlink bandwidth part (DL BWP), with PRS having the same numerology as the active DL BWP.

Inside the PRS processing window (PPW), subject to the UE determining that DL PRS to be higher priority, support the following UE capabilities:

Capability 1: PRS prioritization over all other DL signals/channels in all symbols inside the PRS processing window.

Capability 1A: The DL signals/channels from all DL CCs (per UE) are affected.

Capability 1B: Only the DL signals/channels from a certain band/CC are affected.

Capability 2: PRS prioritization over other DL signals/channels only in the PRS symbols inside the PPS processing window.

A UE shall be able to declare a PRS processing capability outside MG.

For the purpose of this feature, PRS-related conditions are expected to be specified, with the following to be down-selected:

Alt. 1: Applicable to serving cell PRS only

Alt. 2: Applicable to all PRS under conditions to PRS of non-serving cell.

When the UE determines higher priority for other DL signals/channels over the PRS measurement/processing, the UE is not expected to measure/process DL PRS which is applicable to all of the above capability options.

The following options are supported, subject to UE capability for priority handling of PRS when PRS measurement is outside MG.

Option 1: UE may indicate support of two priority states.

State 1: PRS is higher priority than all PDCCH/PDSCH/CSI-RS

State 2: PRS is lower priority than all PDCCH/PDSCH/CSI-RS

Option 2: UE may indicate support of three priority states

State 1: PRS is higher priority than all PDCCH/PDSCH/CSI-RS

State 2: PRS is lower priority than PDCCH and URLLC PDSCH and higher priority than other PDSCH/CSI-RS Note: The URLLC channel corresponds to a dynamically scheduled PDSCH whose PUCCH resource for carrying ACK/NAK is marked as high-priority.

State 3: PRS is lower priority than all PDCCH/PDSCH/CSI-RS

According to some examples State 1 is considered a high priority state for PRS, State 2 is considered an intermediate or middle priority state for PRS, and State 3 is considered a low priority state for PRS.

Option 3: UE may indicate support of single priority state

State 1: PRS is higher priority than all PDCCH/PDSCH/CSI-RS

From the above, it is seen that in "Capability 2" the UE only prioritizes the PRS in the symbols within the PRS processing window (PPW) where the PRS is configured. This means that other symbols inside the window should have the normal priority rules.

It is also seen that in the PRS priority options under Option 2 and State 2, that the PRS should be lower priority than Ultra-Reliable Low Latency Communication (URLLC) PDSCH. This means that the UE needs to decode the downlink control information (DCI) carried by the physical downlink control channel (PDCCH), to determine if a given physical downlink shared channel (PDSCH) is higher or lower priority than the PRS. The present disclosure identifies that this may create a problem. This is because the UE may also need to receive the PDCCH in the symbol prior to the PRS, and the UE then may not have enough time to switch beams in order to receive the PRS, if the UE is performing beamforming. For example, the UE may need to switch beams in order to receive PRS from multiple cells (e.g. from serving cell and one or more neighboring cells) This is shown schematically in FIG. 1, which shows a PPW starting at time to. In the example of FIG. 1, PDCCH 102 is received before the PPW is commenced, and PDSCH 104 is received once the PPW has commenced. The positioning reference signal (PRS) is shown schematically at 106. As shown in FIG. 1, the UE receives PDCCH to determine PRS priority (for example from a DCI. The DCI includes information indicating a priority of the PDSCH), but may not have time to switch beams for PRS reception. Accordingly, the PRS may be dropped. However, the current specifications make an assumption that the UE has received the PRS.

Additionally, the present disclosure identifies another problem which may occur is that if the PDCCH is in the symbol prior to high priority PRS (e.g., State 1 in any of the PRS priority options) then the UE is expected to always measure the PRS. However, the UE again may not have time to switch beams to receive the PRS, as the UE first needs to finish receiving the PDCCH which is outside of the PRS processing window (or inside but prior to the PRS symbols), even if the UE does not need to decode the DCI to determine priority over PDSCH.

It is believed that the issue of how "Capability 2" from the working assumption interacts with "Option 2" from the Agreement has not been considered prior to the present disclosure.

With the above considerations in mind, the present disclosure proposes how a UE can handle PRS priority, when the PRS is received outside of a measurement gap (MG) but in the PPW.

According to examples, a UE is configured with a positioning processing window (PPW) for positioning reference signal (PRS) reception outside of the measurement gap (MG). Moreover, the UE supports "Capability 2" for PRS reception outside the MG. As mentioned above, Capability 2 is PRS prioritization over other DL signals/channels only in the PRS symbols inside the PPW. As part of this configuration a PRS priority state is indicated to the UE, and the UE prioritizes the PRS in the symbols where the PRS is configured under the current 3GPP standards.

The UE then determines or is pre-configured to interpret that the PRS, inside the PPW, is immediately following a PDCCH symbol that the UE needs to monitor.

In examples, the UE uses a buffer symbol to assist with the reception of the PRS outside of the MG. According to examples, the buffer symbol can be used according to any of the following alternatives, dependent on requirement:

The buffer symbol can be placed at the beginning of the PPW

The buffer symbol is placed within the PPW, but prior to PRS symbols within the PPW It will also be noted that the number of buffer symbol(s) required may be dependent on UE capability and/or network system. For example, the number of buffer symbol(s) required may be dependent on one or more of: UE beam switching capability; UE DCI decoding capability. More than one buffer symbol may be required in some cases. In some examples, the size of the buffer period comprises one or more symbols. For example, the buffer period may be considered a length of time of the buffer symbol(s). In some examples, the symbols comprise OFDM (Orthogonal Frequency Division Multiplexing) symbols. In one particular example, the buffer period comprises one OFDM symbol. According to some examples, the UE determines the number of buffer symbols required. For example, a UE may require X ms for beam switching, and Y ms for DCI decoding. The UE therefore needs the total time of the buffer symbols to then be greater than max [X,Y]. If OFDM symbol length (which is determined by SCS) is not enough then more than one symbol is needed.

Therefore, it may be considered that based on received priority information (e.g. information of configured priority state) and received information of a time window (e.g. PPW), the UE uses one or more buffer symbols to receive one or more positioning reference signals during the time window. In some examples, it is considered that the buffer symbols assist the UE in receiving the one or more positioning reference signals.

In examples, the buffer symbol may be considered a gap in time where the UE may perform certain actions, and during which time the UE is not expected to receive some signals/channels.

During the buffer symbol(s) the UE may perform one or more of the following actions:

Drop the PRS and receive the PDCCH, in order for the UE to decode the DCI and determine the PRS priority;

If PRS is higher priority than PDSCH, drop the PDSCH, and use the time to switch the received beam so that the PRS can be received; and/or UE may drop the PRS and use the gained time to switch the received beam.

After the buffer symbol(s), the UE follows the determined PRS priority, and receives the PRS as normal. In case some PRS symbols are dropped due to the buffer symbol(s) and the UE may perform one or more of the following:

PRS measurements based on partial PRS resources (e.g., use 5 of 6 configured PRS symbols in the PRS resource); and/or Waiting to make PRS measurement on a full PRS resource (i.e., drop the PRS resource that has been received at the UE if some symbols were dropped due to buffer).
In this case, the UE may optionally indicate such event to the gNB/LMF during the measurement report.

Where the UE makes PRS measurements based on partial PRS resources, in some examples the UE then sends an indication to the network that a positioning reference signal measurement made by the apparatus is based on the partial positioning reference signals resource.

Some examples will now be described in more detail with respect to FIGS. 2 and 3.

Figure 2:
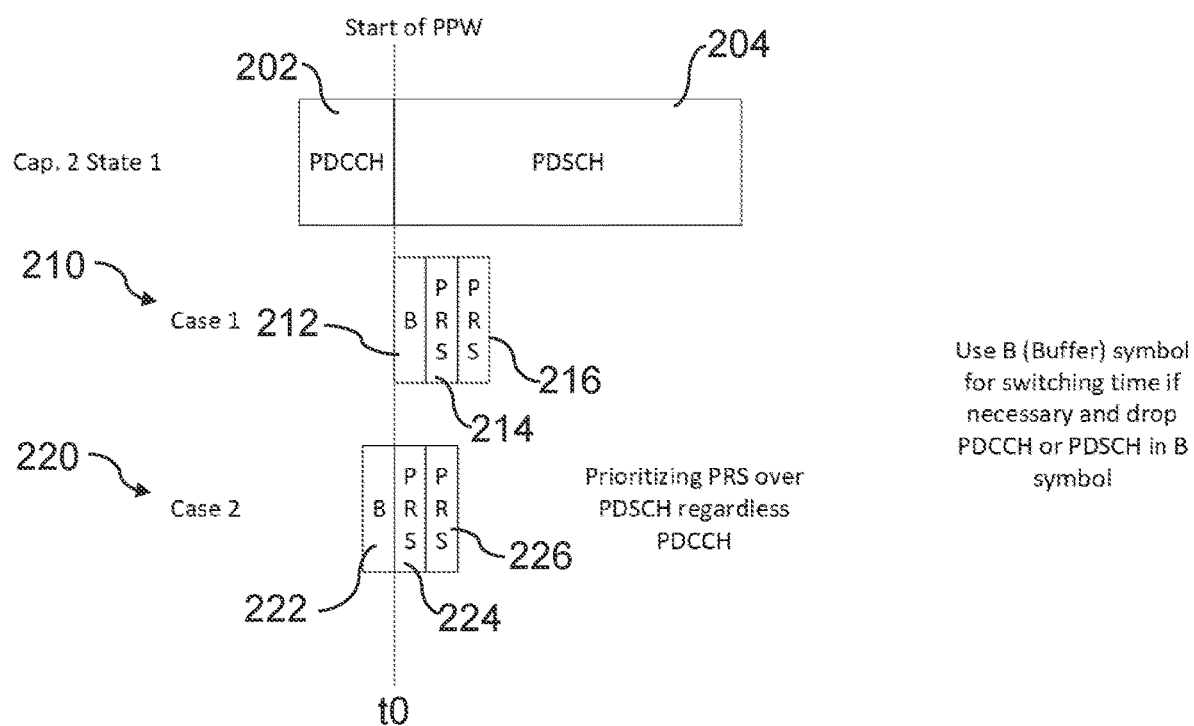
FIG. 2 schematically shows a UE receiving positioning reference signals according to an example.

FIG. 2 schematically shows UE behaviour according to some examples, where the UE has been configured in Capability 2, priority state 1 i.e. PRS has a higher priority than all PDCCH/PDSCH/CSI-RS. The PPW starts at time t0, the PDCCH is schematically represented at 202, and the PDSCH is schematically represented at 204.

A first case, or Case 1, is schematically shown at 210. In Case 1, the UE receives the PDCCH prior to the start of the PPW and/or buffer symbol. A DCI is received on the PDCCH. However, since the UE is configured in priority state 1, the UE is aware that the PRS is highest priority over PDSCH, and does not need to decode the DCI in order to determine relative priorities between PRS and PDSCH. The UE then uses the first symbol of the PPW, shown at 212, as a buffer symbol. The UE can then use the time provided by the buffer symbol to switch beams (if necessary), in order to receive one or more PRS. The UE may then receive one or more PRS signals, as shown schematically at 214 and 216.

During the buffer symbol 212, and the PRS signals 214 and 216 the UE drops reception of PDSCH, in accordance with the priority state. In some examples, a base station (gNB) communicating with the UE instructs the UE to start the PPW one symbol prior to the start of the PRS symbols, in order to accommodate the buffer symbol.

A second case, or Case 2, is schematically shown at 220. In Case 2, the UE uses a symbol prior to the PPW for a buffer symbol 222. The UE may use the period of the buffer symbol 222 for beam switching, if necessary. This then enables the first PRS signal 224 to start in the first symbol of the PPW. In other words, in Case 2 the buffer symbol is outside of the PPW. In the example of FIG. 2, the overlap of the buffer symbol 222 with the PDCCH 202 requires dropping of a PDCCH symbol in order to accommodate the buffer symbol 222. However, in some scenarios this may be considered a worthwhile trade-off in order to start receiving the PRS 224 and 226 as soon as possible in the PPW. Therefore it may be considered that in terms of priority, the UE considers the buffer symbol as analogous to a PRS (where in the priority state of FIG. 2, the PRS has priority over PDCCH and PDSCH).

Figure 3:
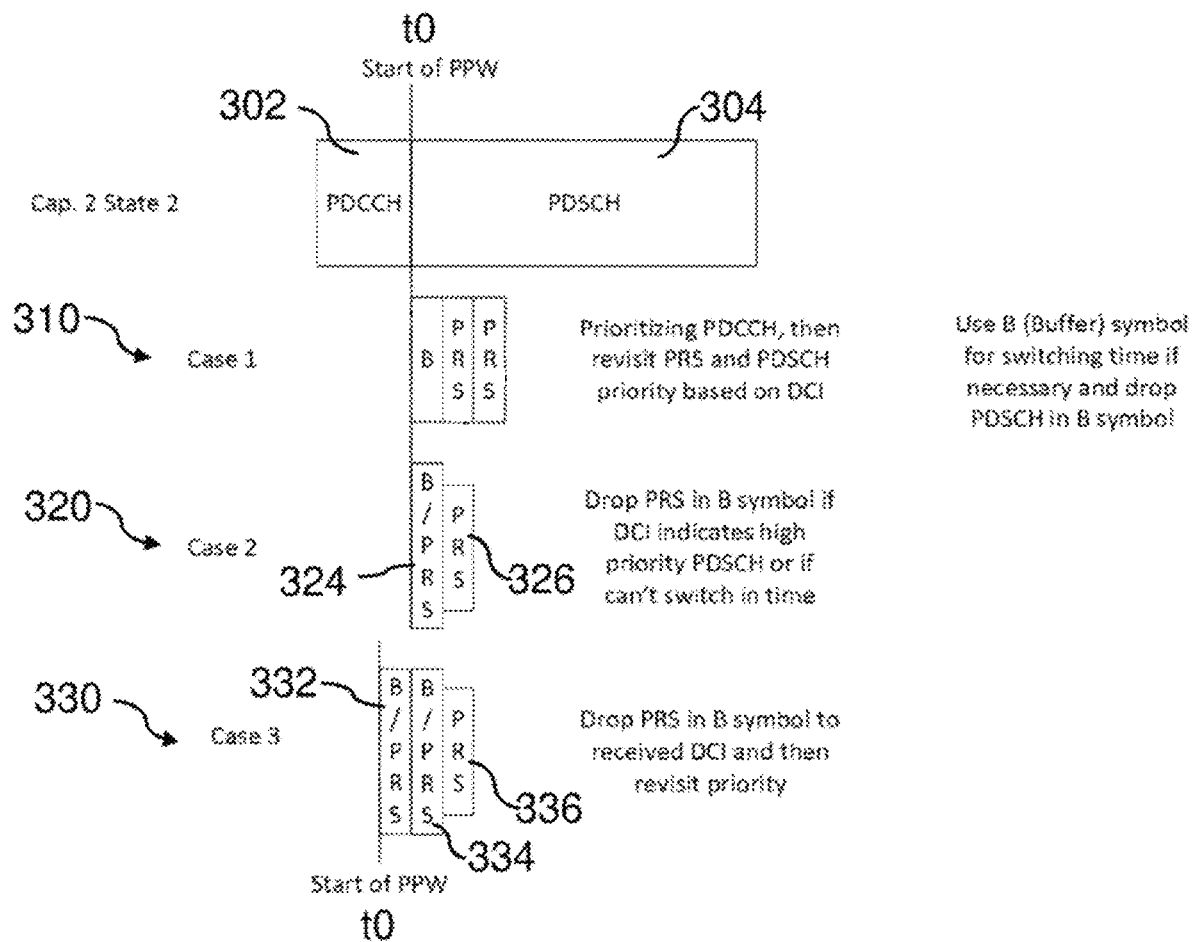
FIG. 3 schematically shows a UE receiving positioning reference signals according to an example.

FIG. 3 schematically shows UE behaviour according to some examples, where the UE has been configured in Configuration 2, priority state 2 i.e. PRS is lower priority than PDCCH and URLLC PDSCH, and PRS is higher priority than other PDSCH/CSI-RS.

In FIG. 3, PDCCH is schematically shown at 302, and PDSCH is schematically shown at 304. The PPW starts at t0. In examples, a DCI is received on the PDCCH, prior to the PPW. Note that in other examples, the DCI could also be received during the PPW (e.g. if the PDCCH is inside the PPW). In examples, when in configuration 2, priority state 2 the UE needs to finish decoding the DCI before it can confirm whether PRS or PDSCH takes priority in the PPW (since some, but not all, PDSCH takes priority over PRS). Therefore, in the example of FIG. 3, the buffer symbol(s) can be used to give the UE sufficient time to finish decoding the DCI and/or to accommodate beam switching, if necessary.

A first case, or Case 1, is schematically shown at 310. The first case 310 is the same as the first case 210 of FIG. 2, and is therefore not described in any further detail here.

A second case, or Case 2, is schematically shown at 320. In the second case 320, the UE is configured with PRS at the beginning of the PPW, but first needs to finish decoding the DCI, and optionally to change beams to receive PRS (if decoded DCI indicates that PRS takes precedence). Therefore, in case 2 the first symbol 324 of the PPW becomes a buffer symbol in place of a PRS symbol. In other words, the PRS symbol is replaced with a buffer symbol. The buffer symbol in 324 then gives the UE sufficient time to finish decoding DCI, and to switch beams if necessary. Of course, in some instances, the DCI may indicate that the PRS does take priority, and then the next available symbol 326 can be a PRS signal. In other instances, the decoded DCI may indicate that low latency traffic (e.g. URLLC traffic) takes precedence over the PRS, in which case the next available symbol slot after the buffer 324 may be reserved for PDSCH 304.

A third case, or case 3, is schematically shown at 330. In case 3, the start of the PPW is shifted back relative to case 1 and case 2 of FIG. 3. As shown in case 3 there is overlap between the PPW and the period when PDCCH is scheduled. In some examples, during this overlap period, PDCCH is given priority over PRS, and therefore the UE would drop B/PRS symbol (e.g., 332 and/or 334) in favour of PDCCH.

As per case 2, the UE utilises one or more buffer symbols to give the UE time to finish decoding DCI, and/or to switch beams if deemed necessary. In the example of FIG. 3, two buffer symbols 332 and 334 are used (by way of non-limiting example). If the DCI indicates PRS priority over PDSCH, then the next available symbol 336 may be reserved for PRS reception. If on the other hand the DCI indicates priority to the PDSCH (e.g. URLLC traffic), then the next available symbol may be reserved for PDSCH. Therefore, in case 3, two (or more) buffer symbols may be used because in the first buffer symbol 332 the UE still needs to receive PDCCH.

In some examples, if the PPW is before the PDCCH then a buffer symbol may be provided at the end of the PPW, to ensure the UE can switch beams to receive the PDCCH properly.

Figure 4:
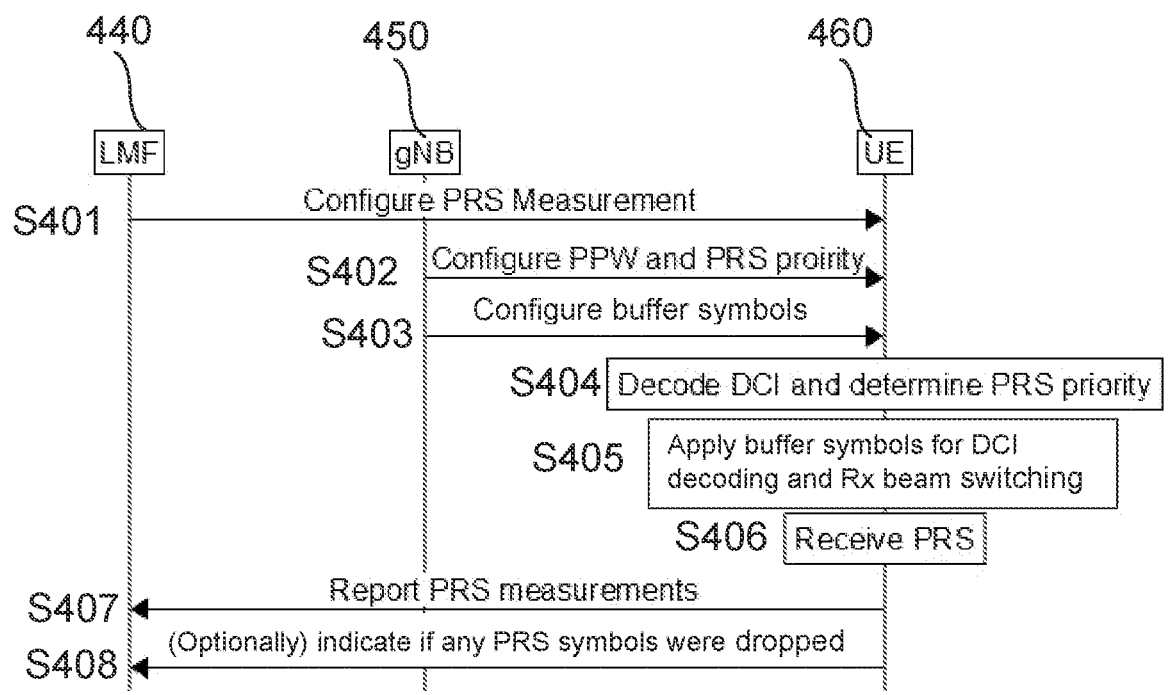
FIG. 4 schematically shows a flow chart of a method according to an example.

FIG. 4 is a signalling diagram which further explains the disclosed concepts. FIG. 4 shows communication between a location management function (LMF) 440, base station or gNB 450, and UE 460.

At S401, the LMF 440 configures the UE 460 for PRS measurement.

At S402, the gNB 450 configures the UE 460 for PPW and PRS priority. For example, the gNB 450 transmits priority information and/or time window information by transmitting a high layer signal. More specifically, the gNB may configure a start time for the PPW. The gNB may also configure a duration of the PPW. The PRS priority information may indicate e.g. "Capability 2, State 1", or "Capability 2, State 2" etc. In some examples, the PRS priority information indicates a high priority, a medium priority or a low priority. In some examples, at least a part of the DCI may be used for indicating the PRS priority.

In some examples, the PPW is configured using any one or more of: RRC signalling; MAC CE; DCI).

At S403, the gNB 450 configures one or more buffer symbols for the UE 460. For example, the gNB may configure buffer symbols for the UE as shown in the examples of FIGS. 2 and 3. In some examples, the one or more buffer symbols are implicitly allocated. For example, the one or more symbols may be allocated before or after the start of the PPW which is outside of a measurement gap, such that the UE is able to receive the PRSs or decode the DCI. Alternatively, the one or more buffered symbols are configured as the PRSs.

At S404, the UE 460 decodes DCI and determines PRS priority (e.g. priority relative to PDSCH).

At S405, the UE 460 applies the one or more buffer symbols. For example, the UE 460 may apply one or more buffer symbols for DCI decoding and/or receive beam (Rx beam) switching.

Then, at S406 the UE 460 receives one or more PRS.

At S407, the UE 460 reports PRS measurements to LMF 440.

If any PRS symbols were dropped, the UE 460 may indicate this to the LMF at S408.

Figure 5:
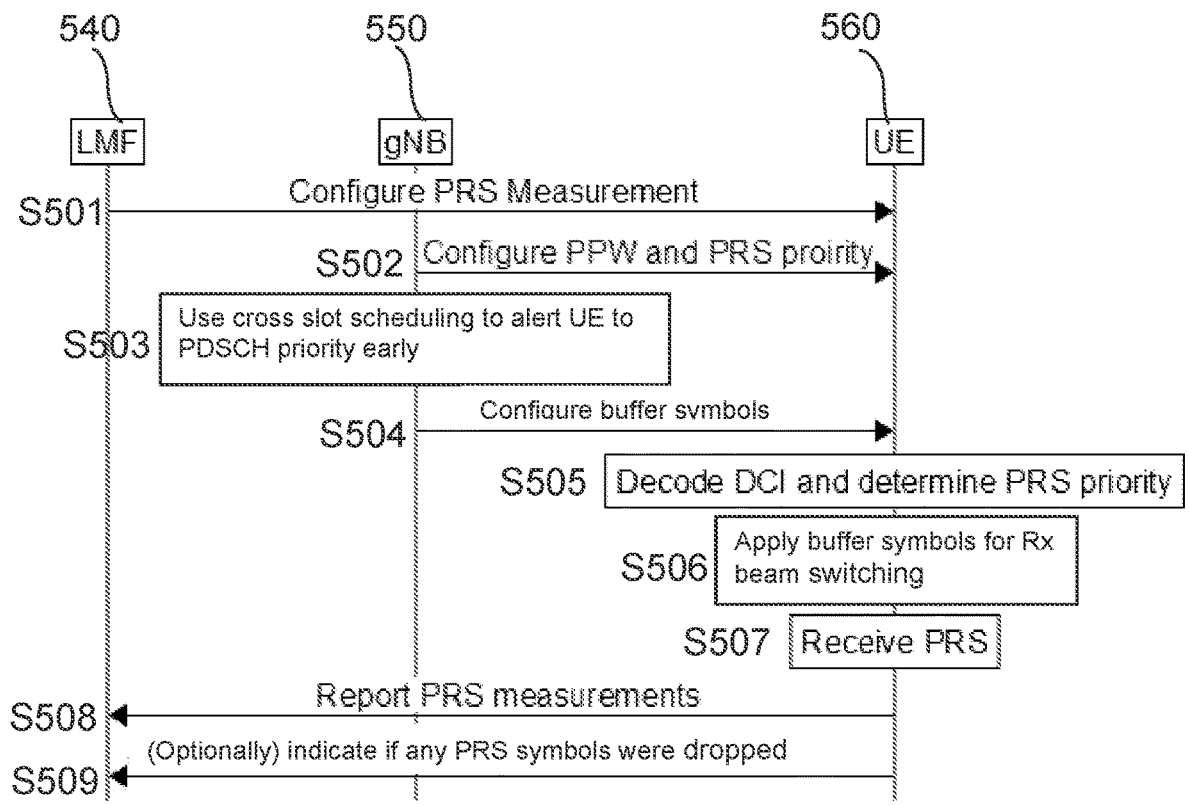
FIG. 5 schematically shows a flow chart of a method according to an example.

In a further example, if a base station (gNB) is aware of PRS occasions (or the gNB assumes that the PRS are configured during PPW), the gNB may use cross-slot scheduling. With cross-slot scheduling, a UE can already decode a DCI in a prior slot so that the UE knows priority of PDSCH versus PRS in a "current" slot. In such an example, the gNB can use cross-slot scheduling for PDSCH overlapped with PRS. This allows the gNB to send DCI earlier, to allow more time for decoding/beam switching. However, this may not always be possible for the gNB due to scheduling constraints or URLLC traffic which arrives quickly and may not be able to wait for later slots to be scheduled, due to QoS requirements. FIG. 5 is a flow chart that schematically shows this process with cross-slot scheduling.

With reference to FIGS. 5, S501 and S502 are the same as S401 and S402 in FIG. 4.

At S503, the gNB 550 uses cross-slot scheduling to provide an early alert to UE 560 of PDSCH.

Then, at S504 the gNB 550 configures the UE with one or more buffer symbols (for example configured as shown in the cases of FIG. 2 or FIG. 3).

At S505, UE 560 decodes the DCI and determines PRS priority (for example PRS priority relative to PDSCH).

At S506, the UE 560 applies the one or more buffer symbols as per the configuration provided at S6. For example, the UE 560 may use the buffer symbols to assist with decoding DCI and/or for Rx beam switching.

At S507, the UE receives the PRS.

At S508, the UE 560 reports PRS measurements to LMF 540.

If any PRS symbols were dropped, the UE 560 may indicate this to the LMF 540 at S509.

Figure 6:
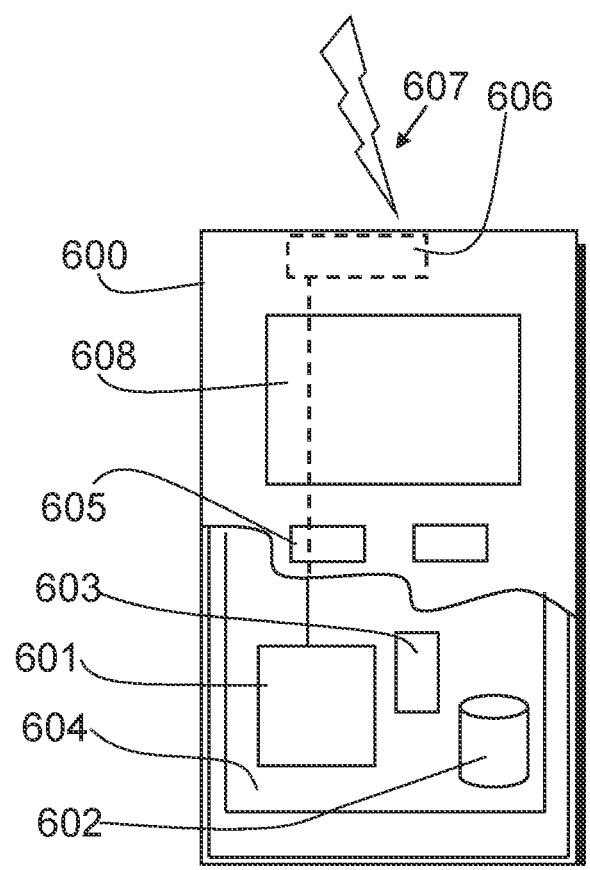
FIG. 6 schematically shows an example of a user equipment.

A possible wireless communication device will now be described in more detail with reference to FIG. 6 showing a schematic, partially sectioned view of a communication device 600. For example, such a communication device could be a UE as described with respect to FIGS. 2 to 5. Such a communication device is often referred to as user equipment (UE), user device or terminal. For example, the UE(s) described in the present application may comprise one or more of the features of the communication device 600. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 600 may receive signals over an air or radio interface 607 via appropriate apparatus for receiving and may transmit signals via appropriate apparatus for transmitting radio signals. In FIG. 6 transceiver apparatus is designated schematically by block 606. The transceiver apparatus 606 may be provided for example by means of a radio part and associated antenna arrangement. The antenna arrangement may be arranged internally or externally to the wireless device.

A wireless device is typically provided with at least one data processing entity 601, at least one memory 602 and other possible components 603 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 604. The user may control the operation of the wireless device by means of a suitable user interface such as key pad 605, voice commands, touch sensitive screen or pad, combinations thereof or the like. A display 608, a speaker and a microphone can be also provided. Furthermore, a wireless communication device may comprise appropriate connectors (either wired or wireless) to other devices and/or for connecting external accessories, for example hands-free equipment, thereto.

Figure 7:
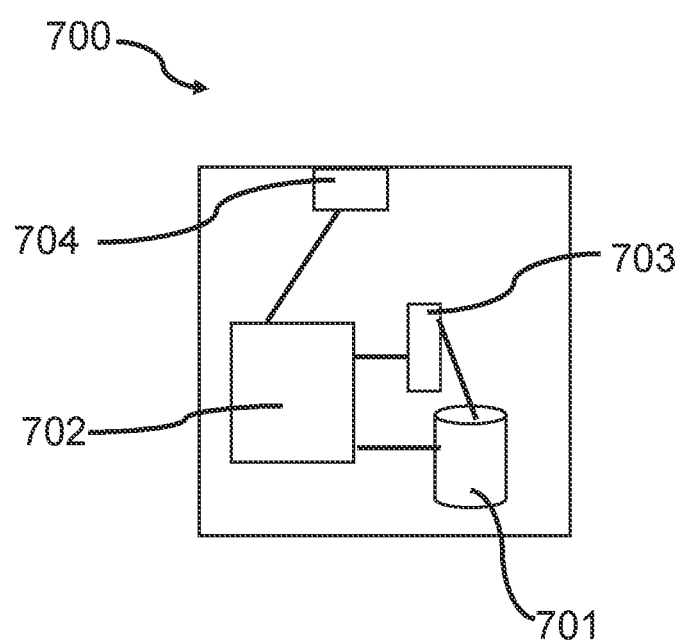
FIG. 7 schematically shows an example of a control apparatus.

FIG. 7 shows an example of a control apparatus 700 for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. For example, the control apparatus could be a base station or gNB as described with respect to FIGS. 2 to 5. The control apparatus 700 can be arranged to provide control on communications in the service area of the system. The control apparatus 700 comprises at least one memory 701, at least one data processing unit 702, 703 and an input/output interface 704. Via the interface the control apparatus can be coupled to a receiver and a transmitter of the base station. The receiver and/or the transmitter may be implemented as a radio front end or a remote radio head. For example, the control apparatus 700 or processor 701 can be configured to execute an appropriate software code to provide the control functions.

Figure 8:
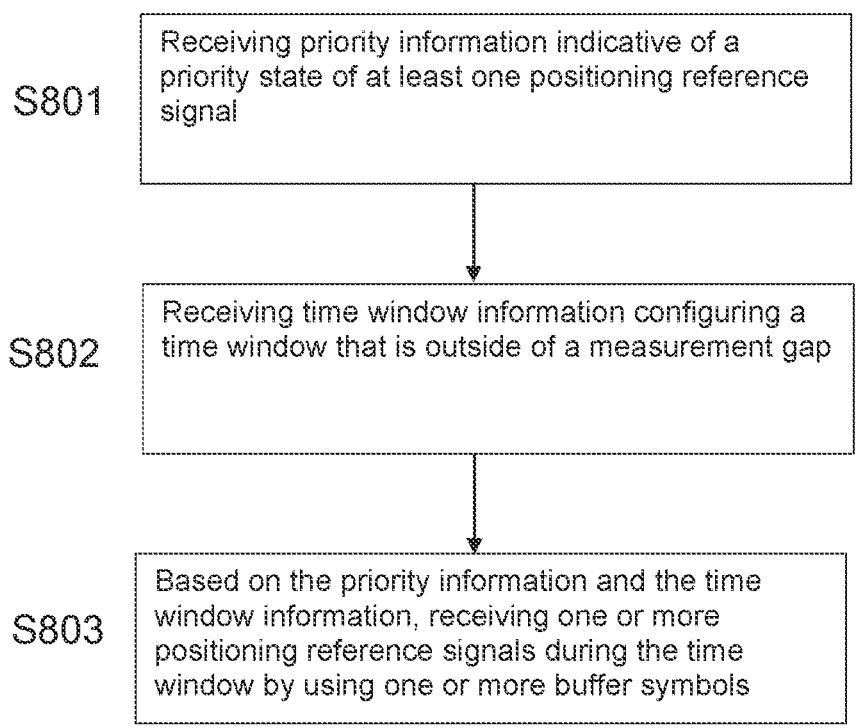
FIG. 8 is a flow chart of a method according to an example.

FIG. 8 is a flow chart of a method according to an example. The flow chart of FIG. 8 is viewed from the perspective of an apparatus. For example, the apparatus may be a user equipment (or user device).

At S801 the method comprises receiving priority information indicative of a priority state of at least one positioning reference signal.

At S802 the method comprises receiving time window information configuring a time window that is outside of a measurement gap.

At S803 the method comprises, based on the priority information and the time window information, receiving one or more positioning reference signals during the time window by using one or more buffer symbols.

The apparatus of FIG. 8 is further able to perform the UE's (460, 560) actions explained in FIGS. 4 and 5.

Figure 9:
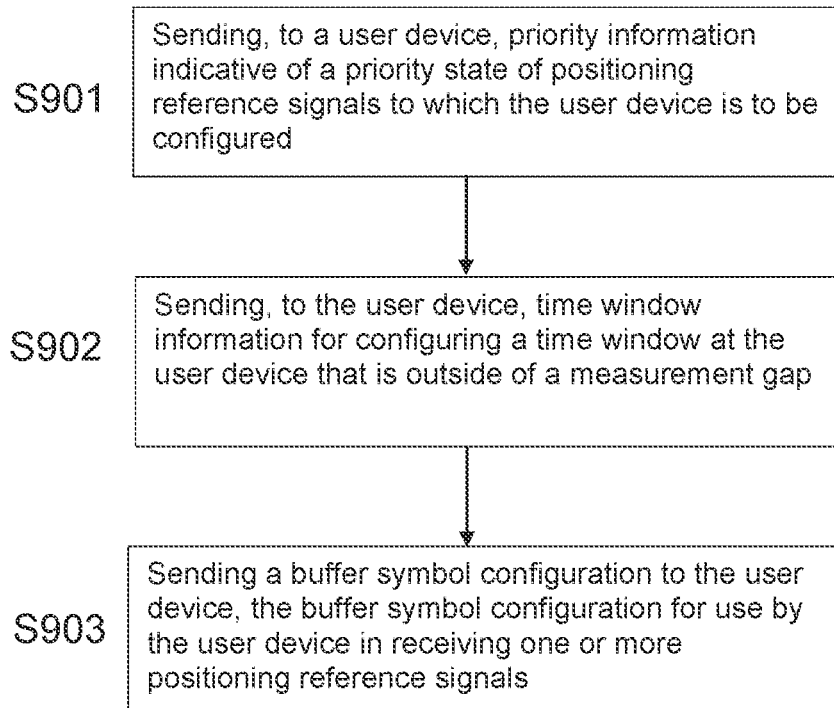
FIG. 9 is a flow chart of a method according to an example.

FIG. 9 is a flow chart of a method according to an example. The flow chart of FIG. 9 is viewed from the perspective of an apparatus. For example, the apparatus may be a base station such as a gNB.

At S901 the method comprises sending, to a user device, priority information indicative of a priority state of positioning reference signals to which the user device is to be configured.

At S902 the method comprises sending, to the user device, time window information for configuring a time window at the user device that is outside of a measurement gap.

At S903 the method comprises sending a buffer symbol configuration to the user device, the buffer symbol configuration for use by the user device in receiving one or more positioning reference signals.

The apparatus of FIG. 9 is further able to perform the actions of gNB (450, 550) and/or LMF (440, 540).

Figure 10:
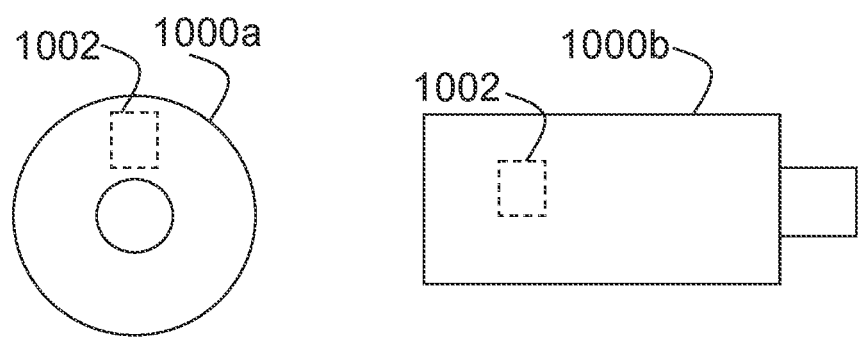
FIG. 10 shows a schematic representation of a non-volatile memory medium storing instructions which when executed by a processor allow a processor to perform one or more of the steps of the methods of some embodiments.

FIG. 10 shows a schematic representation of non-volatile memory media 1000*a* (e.g., computer disc (CD) or digital versatile disc (DVD)) and 1000*b* (e.g., universal serial bus (USB) memory stick) storing instructions and/or parameters 1002 which when executed by a processor allow the processor to perform one or more of the steps of the methods of FIGS. 8 to 9.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus comprising:
   at least one processor; and
   at least one memory including instructions stored therein that, when executed by the at least one processor, cause the apparatus to perform at least:
      receiving priority information indicative of a priority state of one or more positioning reference signals (PRSs);
      receiving time window information configuring a PRS processing window that is outside of a measurement gap; and
      receiving, based on the priority information and the time window information, one or more PRSs during the PRS processing window after one or more symbols,
      wherein the one or more symbols are positioned prior to the one or more PRS symbols configured for the one or more PRSs within the PRS processing window, or
      wherein the one or more symbols are positioned before a start of the PRS processing window.

2. The apparatus of claim 1, wherein the instructions stored in the at least one memory, when executed by the at least one processor, further cause the apparatus to perform: receiving a configuration for the one or more symbols.

3. The apparatus of claim 2, wherein the one or more symbols are based on the received configuration for the one or more symbols.

4. The apparatus of claim 1, wherein the one or more symbols are used to perform beam switching for reception of the one or more PRSs or to process received downlink control information.

5. The apparatus of claim 1, wherein the priority information indicates one of: a first priority state, a second priority state, or a third priority state.

6. The apparatus of claim 5, wherein the instructions stored in the at least one memory, when executed by the at least one processor, further cause the apparatus to perform:
   in an instance in which the priority information indicates the first priority state, prioritizing the one or more PRSs relative to a physical downlink shared channel such that, for at least part of the PRS processing window, the physical downlink shared channel is dropped in favor of the one or more PRSs.

7. The apparatus of claim 5, wherein the instructions stored in the at least one memory, when executed by the at least one processor, further cause the apparatus to perform:
   in an instance in which the priority information indicates the second priority state, prioritizing low latency traffic on a physical downlink shared channel relative to the one or more PRSs.

8. The apparatus of claim 5, wherein the instructions stored in the at least one memory, when executed by the at least one processor, further cause the apparatus to perform:
   in an instance in which the priority information indicates the second priority state, dropping at least one of the one or more PRSs in favor of at least one of the one or more symbols.

9. The apparatus of claim 5, wherein the instructions stored in the at least one memory, when executed by the at least one processor, further cause the apparatus to perform:
   in an instance in which the priority information indicates the third priority state, considering the one or more PRSs as lower priority than one or more of: a physical downlink control channel or a physical downlink shared channel.

10. A method comprising:
    receiving priority information indicative of a priority state of one or more positioning reference signals (PRSs);
    receiving time window information configuring a PRS processing window that is outside of a measurement gap; and
    receiving, based on the priority information and the time window information, one or more PRSs during the PRS processing window after one or more symbols,
    wherein the one or more symbols are positioned prior to one or more PRS symbols configured for the one or more PRSs within the PRS processing window, or
    wherein the one or more symbols are positioned before a start of the PRS processing window.

11. The method of claim 10, further comprising: receiving a configuration for the one or more symbols.

12. The method of claim 11, wherein the one or more symbols are based on the received configuration for the one or more symbols.

13. The method of claim 10, wherein the one or more symbols are used to perform beam switching for reception of the one or more PRSs or to process received downlink control information.

14. The method of claim 10, wherein the priority information indicates one of: a first priority state, a second priority state, or a third priority state.

15. The method of claim 14, further comprising:
in an instance in which the priority information indicates the first priority state, prioritizing the one or more PRSs relative to a physical downlink shared channel such that, for at least part of the PRS processing window, the physical downlink shared channel is dropped in favor of the one or more PRSs.

16. The method of claim 14, further comprising:
in an instance in which the priority information indicates the second priority state, prioritizing low latency traffic on a physical downlink shared channel relative to the one or more PRSs.

17. The method of claim 14, further comprising:
in an instance in which the priority information indicates the second priority state, dropping at least one of the one or more PRSs in favor of at least one of the one or more symbols.

18. The method of claim 14, further comprising:
in an instance in which the priority information indicates the third priority state, considering the one or more PRSs as lower priority than one or more of: a physical downlink control channel or a physical downlink shared channel.

19. A non-transitory computer-readable storage medium comprising instructions stored therein that, when executed by at least one processor of an apparatus, cause the apparatus to perform at least:
receiving priority information indicative of a priority state of one or more positioning reference signals (PRSs);
receiving time window information configuring a PRS processing window that is outside of a measurement gap; and
receiving, based on the priority information and the time window information, one or more PRSs during the PRS processing window after one or more symbols,
wherein the one or more symbols are positioned prior to one or more PRS symbols configured for the one or more PRSs within the PRS processing window, or
wherein the one or more symbols are positioned before a start of the PRS processing window.

20. An apparatus comprising:
at least one processor; and
at least one memory comprising instructions stored therein that, when executed by the at least one processor, cause the apparatus to perform at least:

sending, to a user device, priority information indicative of a priority state of one or more positioning reference signals (PRSs);
sending, to the user device, time window information for configuring a PRS processing window that is outside of a measurement gap; and
sending a symbol configuration to the user device, the symbol configuration for use by the user device in receiving one or more PRSs during the PRS processing window after one or more symbols,
wherein the one or more symbols are positioned prior to one or more PRS symbols configured for the one or more PRSs within the PRS processing window, or
wherein the one or more symbols are positioned before a start of the PRS processing window.

21. The apparatus of claim 20, wherein the instructions stored in the at least one memory, when executed by the at least one processor, further cause the apparatus to perform:
cross-slot scheduling when sending the priority information.

22. A method comprising:
sending, to a user device, priority information indicative of a priority state of one or more positioning reference signals (PRSs);
sending, to the user device, time window information for configuring a PRS processing window that is outside of a measurement gap; and
sending a symbol configuration to the user device, the symbol configuration for use by the user device in receiving one or more PRSs during the PRS processing window after one or more symbols,
wherein the one or more symbols are positioned prior to one or more PRS symbols configured for the one or more PRSs within the PRS processing window, or
wherein the one or more symbols are positioned before a start of the PRS processing windows.

23. A non-transitory computer-readable storage medium comprising instructions stored therein that, when executed by at least one processor of an apparatus, cause the apparatus to perform at least the following:
sending, to a user device, priority information indicative of a priority state of one or more positioning reference signals (PRSs);
sending, to the user device, time window information for configuring a PRS processing window that is outside of a measurement gap; and
sending a symbol configuration to the user device, the symbol configuration for use by the user device in receiving one or more PRSs during the PRS processing window after one or more symbols,
wherein the one or more symbols are positioned prior to one or more PRS symbols configured for the one or more PRSs within the PRS processing window, or
wherein the one or more symbols are positioned before a start of the PRS processing windows.

* * * * *